United States Patent [19]

Fritz et al.

[11] 3,935,082

[45] Jan. 27, 1976

[54] PROCESS FOR MAKING LEAD ELECTRODE

[75] Inventors: Heinz Peter Fritz, Garching; Detlef Missol, Hart, both of Germany

[73] Assignee: Rheinisch-Westfalisches Elektrizitatswerk AG, Essen, Germany

[22] Filed: May 10, 1974

[21] Appl. No.: 468,804

Related U.S. Application Data

[63] Continuation-in-part of Ser. No. 440,449, Feb. 7, 1974, abandoned.

[30] Foreign Application Priority Data

Feb. 13, 1973 Germany............................ 2306957

[52] U.S. Cl.................................. 204/32 R; 204/57
[51] Int. Cl.$^2$....................... C25D 5/42; C25D 9/06
[58] Field of Search.......................... 204/32 R, 57

[56] References Cited
UNITED STATES PATENTS

| | | | |
|---|---|---|---|
| 2,945,791 | 7/1960 | Gibson................................. | 204/57 |
| 3,463,707 | 1/1966 | Gibson et al......................... | 204/57 |
| 3,650,861 | 3/1972 | Angell................................ | 204/32 R |

FOREIGN PATENTS OR APPLICATIONS

| | | | |
|---|---|---|---|
| 1,189,183 | 4/1970 | United Kingdom................... | 204/57 |

*Primary Examiner*—R. L. Andrews
*Attorney, Agent, or Firm*—Karl F. Ross; Herbert Dubno

[57] ABSTRACT

In making an electrode for a lead-acid accumulator or the like, a supporting body of titanium is immersed in a boiling solution of oxalic acid containing the ions of a titanium-oxalato complex. This treatment is followed by anodic coating of the titanium body with $PbO_2$ in an electrolyte containing the ions of lead (II), in the presence of a lead (II) salt of an amido, imido, nitrido or fluoro sulfate or phosphate at least during a first anodizing stage. The coated electrode may be further immersed in a weakly alkaline medium for a prolonged period.

10 Claims, No Drawings

PROCESS FOR MAKING LEAD ELECTRODE

CROSS-REFERENCE TO COPENDING APPLICATION

The present application is a continuation-in-part of our copending application Ser. No. 440,449 filed 7 Feb. 1974 (now abandoned).

FIELD OF THE INVENTION

The present invention relates to the manufacture of an electrode which contains lead oxide as an active material, as used in lead-acid accumulators or for electrolytic purposes.

BACKGROUND OF THE INVENTION

Solid electrodes of lead oxide are mechanically weak and are therefore of limited practical utility. Use is therefore frequently made of an inert metallic support, such as a plat or a grid, which is coated with lead oxide $PbO_2$, preferably by electrolytic deposition. Such a support advantageously consists of titanium; however, firmly adhering coatings of lead oxide have heretofore been achieved on titanium bodies only by relatively complicated and costly processes.

OBJECT OF THE INVENTION

The object of the invention, therefore, is to provide a simple and inexpensive process for manufacturing electrodes of this nature in a manner insuring dependable adhesion of the lead oxide to its titanium support.

SUMMARY OF THE INVENTION

This object is realized, in accordance with our present invention, by first immersing a titanium body in a mordanting bath consisting of a hot, preferably boiling aqueous solution of oxalic acid, containing at least one titanium-oxalato complex dissolved therein; thereafter, the body so treated is anodically coated with $PbO_2$ in an electrolyte containing the ions of lead (II). Advantageously, the titanium body is initially cleansed and deoxidized in a pickling bath, consisting of hot diluted oxalic acid, which is subsequently enriched with the mordanting agent constituted by the aforementioned titanium-oxalato complex or complexes whose presence prevents any significant amount of titanium from going into solution with evolution of hydrogen therefrom. This treatment, especially at boiling temperature, expels any adsorbed hydrogen and deposits a thin oxalato layer on the electrode surface.

The titanium-oxalato complexes used in the mordanting bath may have a variety of cationic constituents including sodium, potassium or ammonium ions. The anions of this complex, attracted onto the titanium body upon positive energization thereof in an electrolyte, are destroyed in this anodizing step with evolution of $CO_2$ and leave a support surface which is particularly receptive for the subsequent deposition of lead oxide. Thus, a highly homogeneous and firmly adhering $PbO_2$ layer can be formed on that surface from any electrolyte containing lead (II) ions. The inclusion of a wetting agent, especially a nonionic one such as a perfluoro carbonic acid, further improves the adhesion of the coating.

According to yet another feature of our invention, the electrolyte also contains a high concentration of one or more additives forming ions of a lead salt of an organic sulfate or phosphate with a highly polar group, specifically an amido, imido, nitrido or fluoro group. The additive, which at near-saturation levels makes the solution highly conductive, may be introduced either directly as a sulfate or phosphate or in the form of a water soluble lead (II) salt together with amido etc. sulfuric or phosphoric acid. Lead (II) amido sulfate or a mixture of lead nitrate and amido sulfuric acid is especially suitable, the electrolyte being preferably maintained at room temperature in this instance. However, higher temperatures up to or even beyond 70°C are permissible with current densities of preferably not more than about 40 $mA/cm^2$, this relatively low current density improving the homogeneity of the deposit. Further improvements in the structure of the deposite are possible by repeatedly interrupting the anodic treatment for short periods, as by discontinuing the current flow or by removing the electrode body from the electrolyte. We have found that the two measures last referred to (i.e. the alkalinic aftertreatment and the interrupted anodization), taken either singly or together, result in a completely crystallized and dense coating surface as established by raster electron micrographs.

Advantageously, the aforementioned anodizing step is followed by a second electrodeposition in which the electrolyte contains only lead nitrate. We have found that this two-step coating results in a particularly hard and durable layer. Surprisingly enough, the density of that layer is increased by an aftertreatment in a weakly alkalinic aqueous medium, preferably with a pH of about 8.

The titanium body may be a solid plate, an expanded-metal sheet, a grid or any similar structure conventionally used in the art. Its interstices, if any, may be initially filled with lead oxide by conventional anodic treatment in an alkaline electrolyte containing a suitable lead salt.

Since the fastening of terminals to the electrode by spot welding may give rise to high-resistance oxidic or nitritic intermediate layers, we prefer to use contact clamps on the electrode to connect it in an external circuit (e.g. in a storage battery).

SPECIFIC EXAMPLE

A titanium sheet is cleansed by boiling it for one hour in aqueous oxalic acid at 15% concentration. Next, a titanium-oxalato complex with an anion of the $[TiO(C_2O_4)_2]^-$ or $[Ti(C_2O_4)_3]^-$ type (cation = $Na^+$, $K^+$, $NH_4^+$) is dissolved in the same bath until the evolution of hydrogen around the titanium sheet ceases. The sheet remains in this boiling solution for another two hours and is then immersed in an aqueous electrolyte in which 66 grs. of lead nitrate is dissolved along with 0.75 gr. of a wetting agent such as a perfluoro carbonic acid marketed under the designation FC 98 by 3M Co. To lower the resistance of the electrolyte, lead (II) amido sulfate is dissolved therein until its conductivity ranges between $10^{-3}$ and $10^{-4}$ $mho.cm^{-1}$. In this electrolyte the titanium sheet is anodically connected against a suitable counterelectrode to a direct-current source delivering 20 $mA/cm^2$, the electrolyte being maintained at a temperature of 65°C. The current flow is continued for several hours, with brief interruptions every 15 minutes, until the deposit of lead oxide on the sheet almost reaches the thickness desired for this coating. The final deposition is carried out under similar conditions in an electrolyte containing only lead nitrate. Finally, the fully coated electrode is rinsed in water and thereafter treated for two hours in a boiling aqueous solution of sodium hydroxide of pH ≈ 8.

Electrodes so produced were tested under various charging conditions in a cell in which they were anodically connected by terminal clamps as discussed above. The following results were obtained:

a. At 40 mA/cm$^2$ and 2.45V, in an electrolyte consisting of a 20% aqueous solution of sulfuric acid at room temperature, no significant changes were observed for at least 1000 hours.

b. Upon an increase of the charging current 100 mA/cm$^2$ and cell voltage to 2.75 V, with no change in the temperature of concentration of the electrolyte, a slight initial loss of PbO$_2$ was observed, followed by constant evolution of O$_2$ for a period of more than 600 hours.

c. During the electrolysis of a variety of concentrated acidic aqueous solutions at temperatures of 95°C, with a voltage of 3.9 V and a current density of 500 mA/cm$^2$, the terminal voltage remained constant over a prolonged period. No disintegration of the electrode, e.g. as evidenced by the appearance of lead ions in the electrolyte, was observed even after extended use.

We claim:

1. A process for making an electrode containing lead oxide as an active material, comprising the steps of:
   a. immersing a body of titanium in a hot solution of oxalic acid having a titanium-oxalato complex dissolved therein; and
   b. anodically coating the so treated body with PbO$_2$ in an electrolyte containing the ions of lead (II) and the ions of a lead (II) salt of an organic sulfate or phosphate with a highly polar group.

2. A process as defined in claim 1, comprising the further step of cleansing said body in hot diluted oxalic acid prior to the treatment in step (a).

3. A process as defined in claim 1 wherein said electrolyte further contains a wetting agent.

4. A process as defined in claim 1 wherein said highly polar group is amido, imido, nitrido or fluoro.

5. A process as defined in claim 1 wherein said lead salt is lead (II) amido sulfate.

6. a process as defined in claim 1, comprising the further step of anodically coating the body coated in step (b) with an additional PbO$_2$ layer in an electrolyte having only lead nitrate dissolved therein.

7. A process as defined in claim 1 wherein the body coated in step (b) is boiled in a weakly alkalinic aqueous medium.

8. A process as defined in claim 1 wherein the anodic coating in step (b) is repeatedly interrupted for short periods.

9. A process as defined in claim 1 wherein the solution in step (a) is maintained at boiling temperature.

10. A process for making an electrode containing lead oxide as an active material, comprising the steps of:
   a. immersing a body of titanium in a hot solution of oxalic acid having a titanium-oxalato complex dissolved therein;
   b. anodically coating the so treated body with PbO$_2$ in an electrolyte containing the ions of lead (II); and
   c. boiling the body so coated in a weakly alkalinic aqueous medium.

* * * * *